Patented June 17, 1941

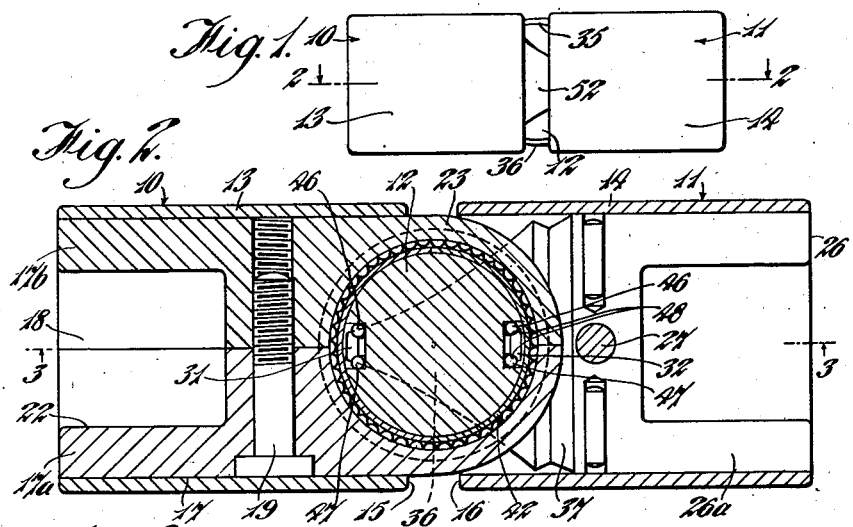
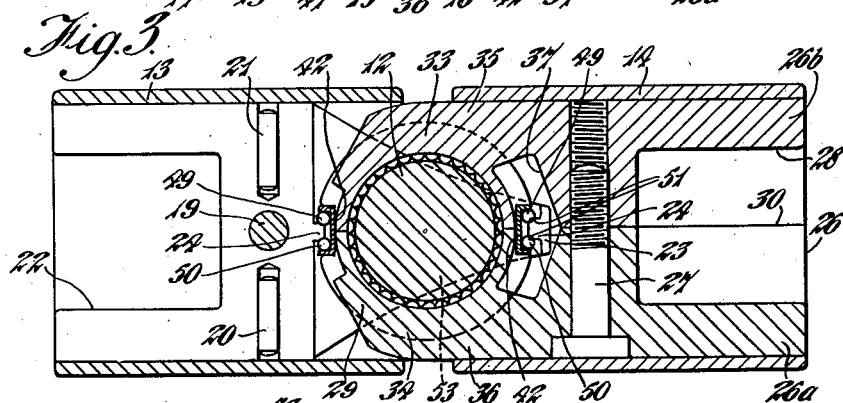
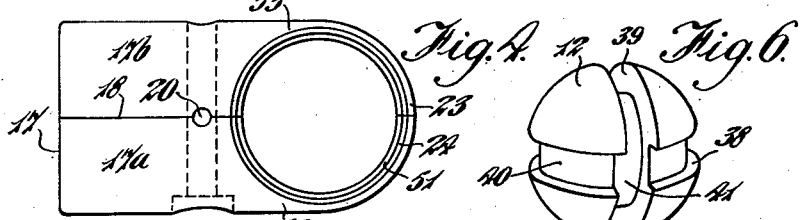
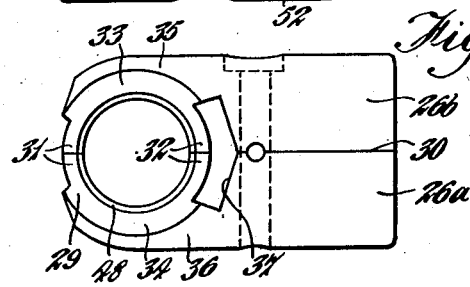
Inventors
Arthur J. Mollart and
John C. Hendra
By: Stevens & Davis
Attys.

2,246,261

UNITED STATES PATENT OFFICE 2,246,261

UNIVERSAL JOINT

Arthur John Mollart and John Charles Hendra, Surbiton, England

Application May 29, 1940, Serial No. 337,907
In Great Britain June 29, 1939

10 Claims. (Cl. 64—16)

This invention relates to universal joints which are used in the transmission of rotating shaft or spindle motion and it has particular reference to universal joints of the kind in which a pair of elements, to and from which the drive is taken, are positively connected together by a ball member, which latter is formed with a pair of circumferential grooves disposed in planes substantially at right angles and having a common centre, said grooves being embraced respectively by fork arms or equivalent extending from the elements.

It is the primary object of the present invention to provide an improved construction of universal joint which has been specially arranged with a view to permitting the incorporation of balls or rollers between the relatively moving parts in order to reduce friction during operation. The invention has for a further object to provide an improved construction of universal joint which embodies anti-friction balls for the purpose of improving the efficiency of the joint and enabling the latter to operate at relatively high rotational speeds.

In a universal joint comprising a pair of elements to and from which the drive is taken, said elements being positively connected together by a ball member which is formed with a pair of circumferential grooves, disposed in planes substantially at right angles, and having a common centre, the present invention is characterised by the fact that said grooves are of different diameters and are engaged by corresponding annular portions formed on the elements, each annular portion being arranged to embrace the ball member through substantially 360°, and that annular portion engaging the smaller diameter groove being disposed inside the annular portion of the other element. The term "diameter" as used in connection with the grooves of the ball member is, of course, intended to denote the diameter of the bottom of the groove, the groove of smaller diameter thus being deeper than the groove of larger diameter.

According to a further aspect of the invention, in a universal joint of the type above referred to, the grooves in the ball member are of different diameters and are engaged by corresponding annular portions formed on the elements, each annular portion being arranged to embrace the ball member through substantially 360° and being rotatably arranged relatively thereto with balls or rollers interposed to reduce friction.

According to a further feature of the invention, the said grooves in the ball member are of different diameters and are engaged by corresponding annular portions formed on the elements, each annular portion being arranged to embrace the ball member through substantially 360° and one of said annular portions being arranged to extend through an aperture disposed between the main part of the other element and the annular portion thereof.

Preferably that groove of the ball member having the larger diameter is fitted with an annular lining which bridges the groove of smaller diameter at the two places of intersection, the lining conveniently being of channel shape in radial section. If desired both elements of the joint, with their annual portions, may be split longitudinally to permit assembly, the split extending diametrally of the annular portion. Where balls are incorporated to reduce friction, two circumferential rows of balls may conveniently be interposed between each annular portion and the corresponding groove of the ball member, the groove of smaller diameter being bridged at the two places where it intersects the other groove, thus providing continuous races for the balls within the groove of larger diameter.

Preferably the annular portions are formed integrally with the respective elements and are shaped to increase progressively in thickness towards the said element, each being formed internally with a rib or spline engaging the corresponding groove in the ball member. That element corresponding with the groove of larger diameter may have a portion of its rib or spline arranged to be self-supporting and isolated from the body of the element by a substantially arcuate aperture, through which latter the annular portion of the other element passes. The edges of the ribs or splines may be grooved to form races for pairs of circumferential rows of balls, the opposite races for which are constituted by the internal "corners" of the groove of smaller diameter in the ball member and of a channel-shaped lining disposed within the groove of larger diameter.

One form of universal joint which will be described as an example of the invention is illustrated in the accompanying drawing, in which:

Figure 1 is an outside elevation of the joint drawn to a reduced scale;

Figure 2 is a sectional plan taken on the line 2—2 of Figure 1;

Figure 3 is a sectional elevation taken on the line 3—3 of Figure 2;

Figure 4 is a plan of the left-hand element of the joint drawn to a reduced scale, the outer sleeve being omitted;

Figure 5 is a similar view showing the right-hand element in elevation;

Figure 6 is a perspective view of the ball member; and

Figure 7 is a perspective view of the lining to fit within the groove of larger diameter.

The universal joint comprises briefly a pair of elements which are indicated generally at 10 and 11 and are coupled together by a ball member 12 in such a manner that the joint is capable of efficiently transmitting torque, even when the elements 10 and 11 are disposed out of line. The elements 10 and 11 are provided with outer sleeves 13 and 14 which, in addition to increasing the strength of the joint by holding the parts together, act also as stops to prevent excess angular deflection of the joint, the two end surfaces 15 and 16 of said sleeves 13 and 14 being arranged to come into contact and roll upon one another when the maximum working deviation is reached.

Within the sleeve 13 of the coupling element 10 a substantially cylindrical body portion 17 is disposed, this being formed in two parts 17a and 17b, which butt together along an axial plane indicated at 18. The two parts 17a and 17b are held together by a diametral screw 19 and are also held in proper register by a pair of dowel pins 20 and 21 lying with their axes disposed radially and coincident with the plane 18. The body portion 17 is bored at 22 in order that it may be secured to a shaft or spindle (not shown), any convenient form of fixing capable of transmitting the requisite drive being provided. At its opposite end the body portion 17 is formed with an eye or annular portion 23 having internally a spline or rib 24 which extends for substantially 360° around the ball member 12 and which will be seen more clearly in Figure 3. The sides 52 and 53 of the annular portion 23 are arranged to become progressively wider towards the body portion 17, as will be seen in Figure 1, where the side 52 is shown, while the shape of the side 53 is indicated in dotted lines in Figure 3. This construction provides sufficient strength to enable the annular portion 23 to resist distortion when the joint is transmitting a relatively heavy torque.

The right-hand element 11 is somewhat similar in general construction, as it comprises a body portion 26 formed in two parts 26a and 26b, these being held together by a screw 27 as well as by the outer sleeve 14, and the body portion being drilled axially at 28 for the reception of the second shaft or spindle (not shown). The inner end of the body portion 26 is formed integrally with an annular portion 29, the shape of which will be seen more clearly in Figure 5. The annular portion 29 is in the form of a completely circular rib or spline which, adjacent the plane 30 of separation between the parts 26a and 26b, is self-supporting as indicated at 31 and 32, but the side parts 33 and 34 of the annulus are formed inside a pair of fork arms 35 and 36 respectively, the latter of these being indicated in dotted lines in Figure 2. The two parts 26a and 26b are shaped to form a somewhat arcuate slot 37 lying just outside the self-supporting parts 32 of the annulus 29.

The general form of the ball member 12 is shown in Figure 6 and it comprises a metal sphere having a pair of circumferential grooves 38 and 39 each of substantially rectangular shape in radial section. The groove 38 is, however, shallower than the groove 39 and its bottom 40, therefore, is of larger diameter than the bottom 41 of the groove 39. A lining 42, illustrated in Figure 7, is arranged to be fitted into the groove 38 and comprises two semi-circular parts 43 and 44 each of channel shape in radial section. The parts 43 and 44 are a tight press-fit within the groove 38, and when these parts are assembled upon the ball member 12 with their abutting edges 45 substantially displaced from the positions of intersection of the grooves 38 and 39, the lining 42 constitutes a completely circular ball race bridging the groove 39 at two diametrically opposite positions.

In order to reduce working friction as much as possible a number of small metal balls are provided in conjunction with the ball member 12, two rows of balls indicated at 46 and 47 being provided to co-operate with the annulus 29 of the element 11 and the smaller diameter groove 39 of the ball member 12. These balls are arranged to run in corresponding grooves 48 formed within the annulus 29, and on the other hand cooperate with the "corners" of the groove 39, the grooves 48 and said "corners" thus constituting races for the balls. It will be seen that the parts 31 and 32 of the annulus 29 are disposed inside the lining 42 of the ball member 12, said lining, as well as the annulus 23 of the element 10, being arranged to pass through the arcuate slot 37 in the element 11, as will be seen in Figure 3. This arrangement, of course, enables both annuli 23 and 29 to be completely circular, the length of the slot 37 permitting the requisite angular movement of the elements to take place. It will be seen in Figure 3 that two sets of balls 49 and 50 are provided to run between the internal "corners" of the channel-shaped lining 42 and a pair of small grooves 51 formed upon the internal edges of the rib or spline 24. The four rows of balls 46, 47, 49 and 50 act to reduce the friction between each of the elements 10 and 11 and the ball member 12, thus not only increasing the efficiency of the joint but also enabling it to carry a relatively high load without causing overheating. It will, of course, be apparent that the splitting of the body portions 17 and 26 at 18 and 30 respectively along planes which extend diametrally across the corresponding annuli 23 and 29 enables the universal joint to be easily assembled, the body portion 26 being applied to the ball member 12, if desired, prior to the attachment of the lining 42. The balls 46, 47, 49 and 50 all act to resist loads in a radial sense, as well as axially, with respect to the corresponding annulus, and thus enable a close running fit to be obtained between the parts without undue looseness.

It will be understood that the invention is not limited to the form of universal joint described and that various modifications may be made to suit requirements. Thus, in some cases the small metal balls might be replaced by rollers or might be omitted altogether, the completely circular form of the annular portions of the elements serving to give the joint exceptional rigidity.

What we claim is:

1. A universal joint comprising a pair of elements to and from which the drive is taken, said elements being positively connected together by a ball member which is formed with a pair of circumferential grooves, disposed in planes substantially at right angles, and having a common centre, characterised by the fact that said grooves are of different diameters and are engaged by corresponding annular portions formed on the elements, each annular portion being arranged to embrace the ball member through substantially 360°, and that annular portion engaging the smaller diameter groove being disposed inside the annular portion of the other element.

2. A universal joint comprising a pair of elements to and from which the drive is taken, said elements being positively connected together by a ball member which is formed with a pair of circumferential grooves, disposed in planes substantially at right angles, and having a common centre, characterised by the fact that said grooves are of different diameters and are engaged by corresponding annular portions formed on the elements, each annular portion being arranged to embrace the ball member through substantially 360°, and being rotatably arranged relatively thereto, with balls or rollers interposed to reduce friction.

3. A universal joint comprising a pair of elements to and from which the drive is taken, said elements being positively connected together by a ball member which is formed with a pair of circumferential grooves, disposed in planes substantially at right angles, and having a common centre, characterised by the fact that said grooves are of different diameters and are engaged by corresponding annular portions formed on the elements, each annular portion being arranged to embrace the ball member through substantially 360°, and one of said annular portions being arranged to extend through an aperture disposed between the main part of the other element and the annular portion thereof.

4. A universal joint as claimed in claim 2, wherein that groove of the ball member having the larger diameter is fitted with an annular lining which bridges the groove of smaller diameter at the two places of intersection.

5. A universal joint as claimed in claim 2, wherein that groove of the ball member having the larger diameter is fitted with an annular lining which bridges the groove of smaller diameter at the two places of intersection and is of channel shape in radial section.

6. A universal joint as claimed in claim 1, wherein rolling anti-friction members, such as balls or rollers, are interposed between each annular portion and the corresponding groove in the ball member.

7. A universal joint as claimed in claim 2, wherein two circumferential rows of balls are interposed between each annular portion and the corresponding groove of the ball member, the groove of smaller diameter being bridged at the two places where it intersects the other groove, to provide continuous races for the balls within the groove of larger diameter.

8. A universal joint as claimed in claim 2, wherein the annular portions are formed integrally with the respective elements and are shaped to increase progressively in thickness towards the element, each being formed internally with a rib or spline engaging the corresponding groove in the ball member, that element corresponding with the groove of larger diameter having a portion of its rib or spline arranged to be self-supporting and isolated from the body of the element by a substantially arcuate aperture through which the annular portion of the other element passes.

9. A universal joint as claimed in claim 2, wherein the annular portions are formed integrally with the respective elements and are shaped to increase progressively in thickness towards the element, each being formed internally with a rib or spline engaging the corresponding groove in the ball member, the edges of the ribs or splines being grooved to form races for pairs of circumferential rows of balls, the opposite races for which are constituted by the internal "corners" of the groove of smaller diameter in the ball member, and of a channel-shaped lining disposed within the groove of larger diameter.

10. A universal joint as claimed in claim 2, wherein that groove of the ball member having the larger diameter is fitted with an annular lining which bridges the groove of smaller diameter at the two places of intersection, and is in two semi-circular parts butting together at diametrically opposite positions, which latter are displaced from the places where the grooves of the ball member intersect.

ARTHUR JOHN MOLLART.
JOHN CHARLES HENDRA.